United States Patent [19]

Reeves

[11] Patent Number: 4,457,070
[45] Date of Patent: Jul. 3, 1984

[54] FRUIT CROWNER

[76] Inventor: Frederick Reeves, 1777 Grand Concourse, Apt. 6-H, Bronx, N.Y. 10453

[21] Appl. No.: 415,322

[22] Filed: Sep. 7, 1982

[51] Int. Cl.³ .............................................. B26B 9/02
[52] U.S. Cl. ........................................ 30/314; 30/355; 99/537
[58] Field of Search ................. 99/485, 537, 538, 567, 99/646 R, 543, 545; 30/355, 314, 315, 299, 304, 305; 83/835

[56] References Cited

U.S. PATENT DOCUMENTS

| 909,145 | 1/1909 | Brunson | 30/355 |
| 1,266,672 | 5/1918 | Forster | 30/355 |
| 1,482,736 | 2/1924 | Catsules | 30/355 X |
| 1,504,501 | 8/1924 | Pope | 30/355 |
| 1,757,073 | 5/1930 | Boyle | 30/355 X |
| 2,309,814 | 2/1943 | Youngberg | 30/355 |

FOREIGN PATENT DOCUMENTS 158722  2/1921  United Kingdom ................. 30/355

Primary Examiner—Timothy F. Simone
Attorney, Agent, or Firm—Florence U. Reynolds

[57] ABSTRACT

The tool comprises a handle attached to a blade having a series of V-shaped, tapered corrugations extending substantially over the length of the blade and traversing the width of the blade. The edge of the blade at the tapered end of the corrugations is sharpened to form a cutting edge which is curved in the plane parallel to the longitudinal direction of the corrugations to conform more or less to the surface curve of the fruit. It is especially useful for crowning melons.

4 Claims, 4 Drawing Figures

FRUIT CROWNER

BACKGROUND OF THE INVENTION

This invention is in the field of culinary tools and relates to a tool for crowning melons and other types of fruit.

The term "crowning" refers to the process of forming a saw-toothed edge and ridges on the cut surface of halves of a melon or other substantially spherical or ovoid fruit. The purpose is to provide a decorative edge on the fruit and it is of primary interest in the catering and restaurant businesses, although it may also be used in the home.

The conventional method of crowning fruit at present is for an individual to use a straight bladed knife to cut a saw-toothed line around the mid-section of the whole fruit by a series of individual cuts. This method is very time-consuming and depends upon the skill of the operator to produce an accurate ring of regular incisions with a pleasing, professional appearance.

SUMMARY OF THE INVENTION

Therefore the primary object of the present invention is to provide a tool especially designed for crowning fruit.

Another object is to provide such a tool which will provide regular incisions of professional appearance.

A further object is to provide such a tool which will save time by enabling multiple cuts to be made with one stroke.

These and other objects are attained by providing a tool comprising a blade portion having a series of V-shaped, tapered corrugations extending substantially over the length of the blade and traversing the width of the blade, the edge of the blade at the tapered ends of the corrugations being sharpened to form a cutting edge which is curved in the plane parallel to the longitudinal direction of the corrugations to conform substantially to the surface curve of the fruit; and having a handle attached to the blade.

DETAILED DESCRIPTION

Figure 1:
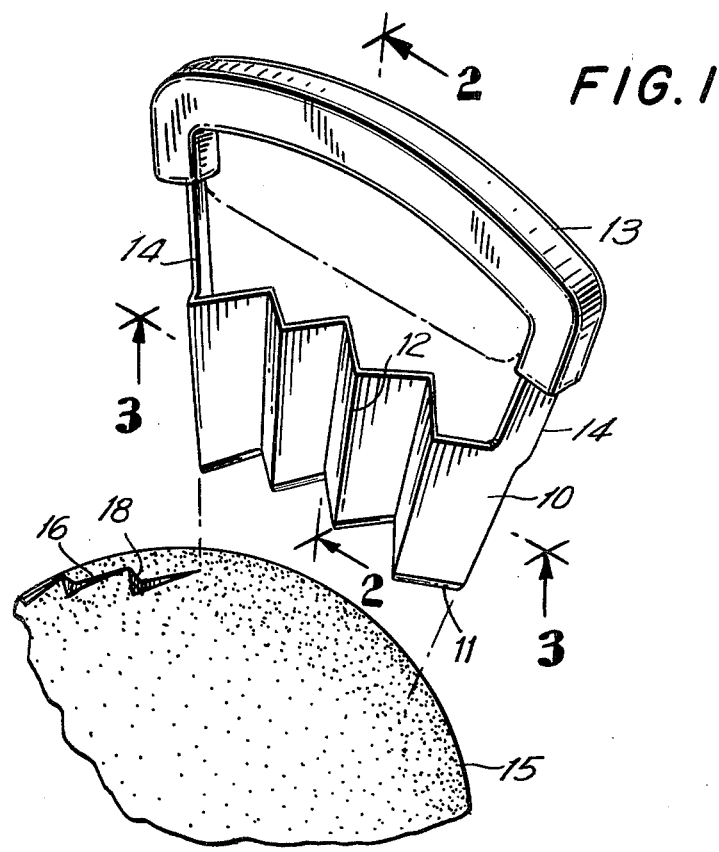
FIG. 1 is a perspective view of the fruit crowner and a partial perspective view of the fruit to be crowned.
Figure 2:
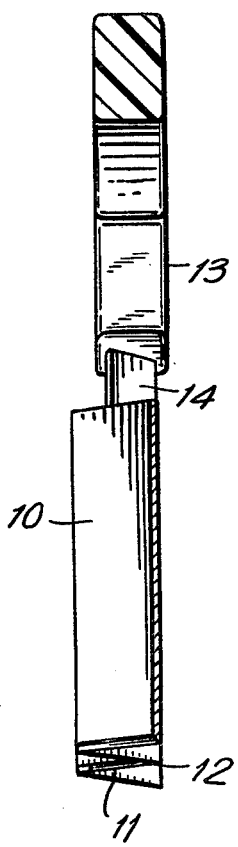
FIG. 2 is a cross sectional view along line 2—2 in FIG. 1.
Figure 3:
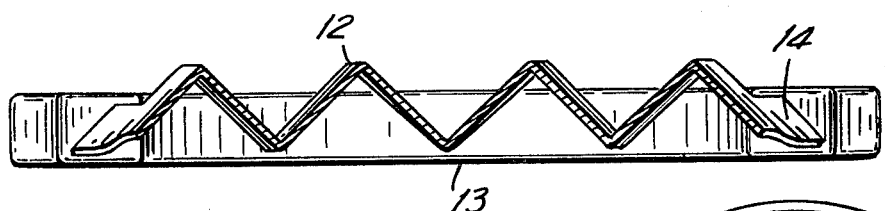
FIG. 3 is a cross sectional view along line 3—3 in FIG. 1.
Figure 4:
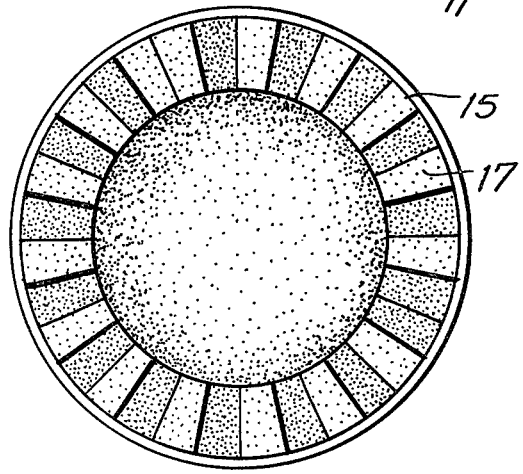
FIG. 4 is a cross sectional view of a fruit which has been crowned by the tool according to the invention.

In FIG. 1 there is shown one embodiment of the fruit crowner according to the invention with a blade portion 10 having slightly tapered V-shaped corrugations 12 extending over the length of the blade and traversing its width. The edge of the blade 10 at the tapered end of the corrugations is sharpened to provide a cutting edge 11. A handle 13 is attached to both ends of the blade on projections 14. The cutting edge 11 is slightly curved in the plane parallel to the longitudinal direction of the corrugations to conform to the surface curve of the fruit so that the cuts will be angled properly to provide substantially even regular cuts. The degree of tapering of the corrugations is very slight, e.g. in the neighborhood of about 3°–10° to provide radial cuts 17 in the inner cut surface of the fruit as shown in FIG. 4 without unduly distorting the cuts 16 on the exterior surface 15 of the fruit. The handle may be open as shown to provide a grip for the fingers or the handle may be integral with the blade and have an indented portion for a finger grip on each side.

As the tool is pressed into the fruit, with the tapered edge entering first, the wider portion of the blade which follows will cut out very small segments 18 toward and including the surface of the fruit so that the two halves will no longer have exactly mating edges. But this will not affect the overall professional appearance of the saw-toothed edge which is formed on the rind of the fruit nor the integrity of the ridged inner surface.

After the tool has penetrated the entire width of the blade into the fruit, it is withdrawn and the fruit broken apart by hand. Then the center may be scooped out and filled with various fruit pieces or other foods, as desired.

Crowning is most often carried out on melons, such as cantaloupe and the dimensions of the tool will generally conform to those of the melon. However, they may be adapted to be used satisfactorily with watermelon, citrus fruits etc. Ideally, the tool should be constructed so that the imaginary projections of the ridges of the tapered corrugations in any one plane meet at a common point which is the center of an imaginary circle of which the projected lines are radii. This imaginary center should correspond to the center of the fruit if it is round or be on a center line is the fruit is ovoid. But due to variations in the sizes and curvature of fruit, this will always be approximate. The object is to design the tapered corrugations so that the cuttings of the ridges will not overlap and produce a ragged or irregular appearance in the ridged portion. The width of the blade should be at least as wide as the shell of the fruit, e.g., the rind and fleshy portion of a cantaloupe, the green and white rind of a watermelon or the rind of citrus fruit.

While specific embodiments of the invention have been shown and described, it is to be understood that numerous changes and modifications may be made therein without departing from the scope and spirit of the invention as set out in the appended claims.

What is claimed is:

1. A fruit crowner comprising (a) a blade portion having a series of V-shaped, tapered corrugations extending substantially over the length of the blade portion and traversing the width of the blade portion, the edge of said blade portion at the tapered end of the corrugations being sharpened to form a cutting edge, said cutting edge being curved in the plane parallel to the longitudinal direction of the corrugations to conform substantially to the surface curve of the fruit, and (b) a handle attached to said blade portion.

2. The fruit crowner of claim 1, wherein said handle extends along substantially the entire length of said blade.

3. The fruit crowner of claim 1, wherein said handle is attached to both ends of the blade portion.

4. The fruit crowner of claim 1, wherein said corrugations are tapered at an angle of about 3°–10°.

* * * * *